United States Patent [19]
Stimson et al.

[11] Patent Number: 5,326,688
[45] Date of Patent: Jul. 5, 1994

[54] COATING COMPOSITIONS FOR ANTISTATIC LAYERS FOR PHOTOGRAPHIC ELEMENTS

[75] Inventors: Ronald M. Stimson; James Skoronski, both of Rochester; Thomas M. Smith, Spencerport; Jack J. Holt, Rochester, all of N.Y.

[73] Assignee: Eastman Kodak Company, Rochester, N.Y.

[21] Appl. No.: 68,479

[22] Filed: May 27, 1993

[51] Int. Cl.$^5$ .............................. G03C 1/82
[52] U.S. Cl. .................... 430/527; 430/528; 430/539; 524/315; 524/364; 524/326
[58] Field of Search ............ 430/527, 528, 539; 524/315, 364, 376

[56] References Cited

U.S. PATENT DOCUMENTS

| | | | |
|---|---|---|---|
| 3,708,289 | 1/1973 | Temmenman | 430/527 |
| 4,070,189 | 1/1978 | Kelley et al. | |
| 4,431,727 | 2/1984 | Steklenk et al. | 430/527 |

Primary Examiner—Jack P. Brammer
Attorney, Agent, or Firm—Robert A. Gerlach

[57] ABSTRACT

A solvent mixture of 8 to 30 weight percent of n-propyl acetate 1-methoxy-2-propanol or cyclohexane, 50 to 55 weight percent of acetone and the balance methanol is employed in a coating composition for applying a polymeric antistatic layer.

16 Claims, No Drawings

COATING COMPOSITIONS FOR ANTISTATIC LAYERS FOR PHOTOGRAPHIC ELEMENTS

FIELD OF THE INVENTION

This invention relates to a method of preparing antistatic layers and particularly to a method of preparing such layers for photographic elements.

BACKGROUND OF THE INVENTION

U.S. Pat. No. 4,070,189 relates to antistatic compositions comprising a highly cross-linked vinylbenzyl quaternary ammonium polymer and a hydrophobic binder. This patent suggests that since the solvent for applying the coating must both disperse the antistatic polymer and dissolve the binder, mixtures of solvents may be desirable. The preferred solvent combination disclosed is acetone/methanol and methanol/propylene chloride/2-methoxyethanol. Subsequently, it has been found that a mixture of acetone, methanol, and methyl chloroform gave particularly good results with regard to coating latitude and to the elimination of an imperfection known as "bloom" which appears as a haze under specular lighting.

Because of environmental reasons, solvents utilizing halogenated hydrocarbons in any degree are suspect. Therefore, in order to avoid any question of environmental degradation, it is desired to replace the methyl chloroform used in the solvent mixture without an accompanying degradation to the photographic films. This is not a simple task because the methyl chloroform in conjunction with the mixture of solvents indicated above gives particularly good results for a variety of reasons as expressed. Thus, one cannot simply remove the methyl chloroform from the solvent formulation or substitute any known solvent in its place and expect to achieve substantially the same results.

SUMMARY OF THE INVENTION

This invention provides an antistatic layer and a method of application to a support, the antistatic layer comprising an antistatic crosslinked vinylbenzyl quaternary ammonium polymer and a hydrophobic binder, the weight ratio of binder to antistatic crosslinked polymer is from about 10:1 to 1:1, preferably 6:1 to 1:1 and most preferably 3:1 to 1.5:1. The antistatic polymer is represented by the formula:

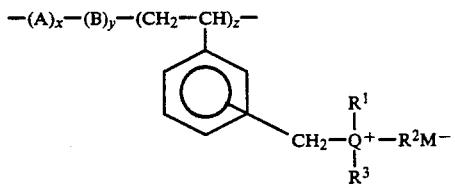

wherein
A represents units of an addition polymerizable monomer containing at least two ethylenically unsaturated groups;
B represents units of a copolymerizable $\alpha,\beta$-ethylenically unsaturated monomer;
Q is N or P;
$R^1$, $R^2$ and $R^3$ are independently selected from the group consisting of carbocyclic, alkyl, aryl and aralkyl, and wherein $R^1$, $R^2$ and $R^3$ together can form the atoms necessary to complete a heterocyclic ring with Q, such as pyridinium.
M— is an anion
x is from about 0.1 to about 20 mole percent;
y is from about 0 to about 90 mole percent; and
z is from about 10 to about 99 mole percent. The antistatic polymer is water dispersible and is particulate in form.

Coverage of said antistatic polymer and said binder is about 0.2 g/m$^2$ to 20 g/m$^2$ dry weight; from a solvent mixture comprising from about 8 to about 30% by weight of n-propyl acetate, 1-methoxy-2-propanol or cyclohexane from about 50 to about 55 weight percent of acetone and the balance methanol.

DETAILED DESCRIPTION OF THE INVENTION

While any of the three solvents mentioned above may be employed together with acetone and methanol in the percentages indicated, it is preferred that the group member, i.e., n-propyl acetate, 1-methoxy-2-propanol or cyclohexane be employed in an amount of from about 10 to about 25 percent by weight based on the total weight of the solvent mixture and for best results the group member be employed in an amount of from about 12 to 20 percent by weight. It has been found that these particular mixtures of solvents when employed for applying the antistatic layer compositions in accordance with this invention produce excellent results with regard to bloom, conductivity, friction characteristics and scratch susceptibility. Of the three, n-propyl acetate is most preferred.

Preferred antistatic polymers according to this invention comprise units having the formula above wherein A is a repeating unit of an addition polymerizable monomer containing at least 2 ethylenically unsaturated groups, such as vinyl groups generally having the structure $$(CH_2=\overset{R^4}{\underset{|}{C}})_nR^5$$

wherein n is an integer greater than 1 and preferably 2 or 3; $R^4$ is selected from hydrogen and methyl and $R^5$ is a linking group comprising 1 or more condensation linkages such as an amide, a sulfonamide, an ester such as sulfonic acid ester, and the like, or a condensation linkage and an organic nucleus, including an alkylene group, such as methylene, ethylene, trimethylene; an arylene group, such as phenylene and others such as phenylenedi(oxycarbonyl), 4,4'-isopropylidene bis(-phenyleneoxycarbonyl), methylenedi(oxycarbonyl), ethylenedi(carbonyl), 1,2,3-propanetriyltris-(oxycarbonyl), cyclohexylenebis(methyleneoxycarbonyl), methyleneoxymethylenedi(carbonyloxy), ethylenebis(oxyethleneoxycarbonyl), ethylidyne trioxycarbonyl, and the like. The monomer (A) used must be stable in the presence of strong alkali and must not be highly reactive so that substantial hydrolysis does not occur during copolymerization.

Suitable examples of monomers from which the repeating units (A) are formed are divinylbenzene, allyl acrylate, allyl methacrylate, N-allylmethacrylate, 4,4'-isopropylidenediphenylene diacrylate, 1,3-butylene, di-acrylate, 1,3 butylene dimethacrylate, 1,4-cyclohexylenedimethylene dimethacrylate, diethylene glycol dimethacrylate, diisopropylidene glycol dimethacrylate, divinyloxymethane, ethylene diacrylate, ethylene dimethacrylate, ethylidene diacrylate, ethylidene dimethacrylate, 1,6-diacrylamidohexane, 1,6-hexamethylene diacrylate, 1,6-hexamethylene dimethacrylate, N,N'=methylenebisacrylamide, 2,2-dimethyl-1,3-trimethylene dimethacrylate phenylethylene dimethacrylate, tetraethylene glycol dimethacrylate, tetramethylene diacrylate, tetramethylene, dimethacrylate, 2,2,2-trichloroethylidene, dimethacrylate, triethylene glycol, diacrylate, triethylene glycol dimethacrylate, ethylidyne trimethacrylate, propylidyne triacrylate, vinyl allyloxyacetate, vinyl methacrylate, 1-vinyloxy-2-allyloxyethane, and the like. Ethylene glycol dimethacrylate is a particularly preferred monomer.

B is a unit of a copolymerizable α, β-ethylenically unsaturated monomer (including two, three or more units) such as ethylene, propylene, 1 butene, isobutene, 2-methylpentene, 2-methylbutene, 1,1,4,4-tetramethylbutadiene, styrene, alpha-methylstyrene; monoethylenically unsaturated esters of aliphatic acids such as vinyl acetate, isopropenyl acetate, allyl acetate, etc.; esters of ethylenically unsaturated mono- or dicarboxylic acids such as methyl methacrylate, ethyl acrylate, diethyl methylenemalonate, etc.; monoethylenically unsaturated compounds such as acrylonitrile, allyl cyanide, and dienes such as butadiene and isoprene. A preferred class of ethylenically unsaturated monomers which may be used to form the ethenic polymers of this invention includes the lower 1-alkenes having from 1 to 6 carbon atoms, styrene, and tetramethylbutadiene and methyl methacrylate.

$R^1$, $R^2$ and $R^3$ are each independent groups selected from the group consisting of carbocyclic preferably containing from 3 to 10 carbon atoms including aryl, aralkyl and cycloalkyl such as benzyl, phenyl, p-methylbenzyl, cyclohexyl, cyclopentyl and the like, and alkyl preferably containing from 1 to 20 carbon atoms, such as methyl, ethyl, propyl, isobutyl, pentyl, hexyl, heptyl, decyl and the like. In the preferred embodiment $R^1$, $R^2$ and $R^3$ are methyl.

M— is an anion, i.e., a negative salt forming an anionic radical or atom such as a halide (e.g., bromide, chloride), sulfate, alkyl sulfate, alkane or arene sulfonate (for example, a p-toluenesulfonate), acetate, phosphate, dialkyl phosphate or similar anionic moiety.

Q is N or P and x is from about 1 to about 20 mole percent and preferably from about 5 to 10 mole percent; y is from 0 to about 90 mole percent and preferably from about 0 to 45 mole percent and z is from about 10 to about 99 mole percent, preferably from about 40 to 99 mole percent.

The polymeric materials according to this invention can be prepared by emulsion polymerizing a vinylbenzyl halide with a polyunsaturated monomer A as described above and an α, β-ethylenically unsaturated monomer B as described above, generally in the presence of an anionic surfactant such as sodium lauryl sulfate,

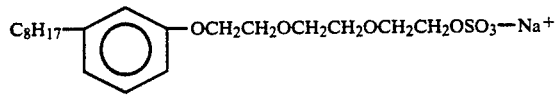

the sodium salt of a sulfated condensate of an alkylphenol and ethylene oxide (Alipal from General Dyestuff Corp.), and the like and a redox free radical initiator such as potassium persulfate-sodium bisulfite, potassium persulfate-$Fe^{+2}$, $H_2O_2$-$Fe^{+2}$ and the like. This process is described, for example, in U.S. Pat. No. 3,072,588.

The above polymeric vinylbenzyl halide latex can be reacted with a tertiary amine or tertiary phosphine having the structure:

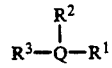

wherein $R^1$, $R^2$, $R^3$ and Q are as described above, generally at temperatures of from about −20° C. to about 150° C. This produces a polymeric microgel latex which has a particulate character.

An alternate method of preparing the polymer is to emulsion polymerize a N-vinylbenzyl-N, N-disubstituted amine monomer with monomers A and B as described above in the presence of an anionic surfactant and a redox free-radical initiator. The resulting polymer tertiary amine latex is reacted with an alkylating agent having the structure $R^3$-M wherein $R^3$ is as described above and M is a group which can be displaced to yield the anion M—, preferably M— is a halide such as chloride or an alkyl or aryl sulfonate group. This reaction can take place at temperatures from about −20° C. to about 150° C.

In formulating the polymer by the methods described above, hydrolysis of the reactive vinylbenzyl halide residues with the liberation of HCl can produce some recurring units of the structure

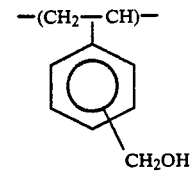

These recurring units are generally present only up to about 5 mole percent of the polymer.

The water-dispersible particulate polymers herein generally have a particle size range of from about 0.04μ to about 0.15μ. In the preferred embodiment, a particulate size range of from 0.06μ to 0.08μ is used.

The term "water dispersible polymers" as used throughout the specification and claims includes polymers which appear as a clear or only slightly cloudy solution on visual inspection but which can be seen to be in particulate dispersion from when examined under an electron microscope.

The polymers are prepared quite easily as the entire preparation can take place in one pot. There is no necessity to use large amounts of solvents. The resulting polymer typically is not completely quaternized. Generally, the mole percent quaternization is from about 80 to about 100 percent.

Polymers which illustrate preferred antistatic polymers of the invention include: copoly[N-vinylbenzyl-N,N,N,-trimethylammonium chloride-coethylene glycol dimethacrylate](93:7)*, copoly[N-vinylbenzyl-N,N,N-trimethylammonium chloride-coethylene glycol diacrylate](90:10), copoly[N-vinylbenzyl-N,N,N-triethylammonium chloride-co-ethylene glycol dimethacrylate](93:7), and copoly[styrene-co-N-vinylbenzyl- N,N,N-trimethylammonium chloride co-divinylbenzene](20:70:10).

\* As used herein the numbers in the parenthesis indicate the molar ratio of monomers in the copolymer.

Preferred polymeric antistatic compositions shown in Table I have the following formula:

TABLE I $$(A)_x(B)_y(CH_2-CH)_2$$

with phenyl substituent $CH_2-Z^+ \begin{matrix} R^1 \\ -R^2 \\ R^3 \end{matrix} Cl^-$

| B | $R^1$ | $R^2$ | $R^3$ | x | y | z | Z | A |
|---|---|---|---|---|---|---|---|---|
| — | CH3 | CH3 | CH3 | 5 | — | 95 | N | divinylbenzene |
| — | pyridinium | | | 5 | — | 95 | N | divinylbenzene |
| — | CH3 | CH3 | CH3 | 2 | — | 98 | N | divinylbenzene |
| styrene | CH3 | CH3 | CH3 | 5 | 47.5/47.5 | | N | divinylbenzene |
| styrene | n-Butyl | n-Butyl | n-Butyl | 2 | 49 | 49 | P | divinylbenzene |
| — | n-Butyl | n-Butyl | n-Butyl | 5 | — | 95 | P | divinylbenzene |
| hexafluorobutyl methacrylate | CH3 | CH3 | CH3 | 2 | 18 | 70 | N | " |
| methyl methacrylate | CH3 | CH3 | CH3 | 5 | 5 | 90 | N | " |
| methyl methacrylate | CH3 | CH3 | CH3 | 5 | 10 | 85 | N | " |
| n-butyl methacrylate | CH3 | CH3 | CH3 | 5 | 5 | 90 | N | " |
| n-butyl acrylate | CH3 | CH3 | CH3 | 5 | 10 | 85 | N | " |
| — | —CH2CH2OH | CH3 | CH3 | 5 | — | 95 | N | " |
| — | CH3 | CH3 | CH3 | 10 | — | 90 | N | " |
| styrene | CH3 | CH3 | CH3 | 4 | 20 | 76 | N | " |
| — | CH3 | CH3 | CH3 | 7 | — | 93 | N | ethylene glycol dimethacrylate |

The antistatic compositions of the present invention are prepared merely by dispersing the crosslinked polymer in a hydrophobic binder. Any hydrophobic binder that is compatible with the crosslinked polymer is suitable. Particulary useful binders are cationic or neutral hydrophobic binders such as acetylated cellulose, poly(methylmethacrylate), poly (ethylacrylate), poly(styrene), poly(butyl methacrylate-co-styrene) (60:40), poly(vinylacetal), cellulose acetate buryrate and the like. By the term hydrophobic it is meant that the binder is not water-soluble or swellable.

The antistatic layer is coated directly from a solvent solution of the mixture of three solvents as described above. Both the binder and the antistatic polymer are initially dissolved in the mixture of solvents and then applied to the support by use of any suitable coating technique including spraying, dipping, slide hopper coating and the like.

In order to achieve the desired physical properties for the antistatic composition the weight ratio of the hydrophobic binder to the antistatic polymer should be between about 10:1 to 1:1. Particularly advantageous compositions are formed where the weight ratio of hydrophobic binder to antistatic polymer is about 5:1 to 2:1. Sufficient solvent can be added to the binder-antistatic polymer composition to facilitate coating. Typically, the coating composition can comprise from about 0.2 weight percent up to 20 weight percent of the binder-antistatic polymer composition, the remainder being the solvent mixture in accordance with this invention.

The coating compositions as described above may be coated on any photographic support material such as paper, baryta coated paper, resin coated paper, pigment coated polymeric film, poly(ethylene terephthalate), cellulose acetate, glass, polycarbonates and the like such as described in *Product Licensing Index*, Vol. 92, December 1971, Publication 9232, pages 107-110.

In order to achieve sufficient conductance and the desired physical properties, the total coverage of the hydrophobic binder-antistatic polymer should be at least about 0.2 g/m$^2$. For economy and also to achieve the desired physical properties the total coverage should be less than 10 g/m$^2$ dry weight. The preferred coverage is between about 0.2 and 1.0 g/m$^2$ and most preferably 0.2 to 0.4. What is meant by "total coverage" is the sum of the coverages for the antistatic polymer and binder. It is to be understood that the coverage for the antistatic layer may be greater due to the presence of other components in the composition.

The antistatic compositions may be coated in any of a wide variety of locations in a photographic element. For example, the antistatic layer may be between the support and the radiation sensitive layers. Alternatively, where the radiation sensitive layers do not require aqueous solution development the antistatic compositions of the present invention may be coated over the top of these layers. For antistatic backings, it is also common practice to overcoat the antistatic layer with additional addenda such as lubricants, antihalation layers, or other polymer layers to achieve desired properties required for many photographic applications. In a highly preferred embodiment of the present invention, the radiation sensitive layers, with an outermost hydrophilic layer, are coated on one side of the photographic support while the antistatic compositions of the invention are coated on the other side of the support. The radiation sensitive layer itself may be the hydrophilic layer or the layer may be overcoated with a hydrophilic layer. This outermost hydrophilic layer may also contain a variety of addenda such as matting agents, antifoggants, plasticizers, haze reducing agents and the like. The outermost hydrophilic layer can comprise any of a large number of water permeable hydrophilic polymers that are well known in the art. Typical hydrophilic polymers include gelatin, albumin, polyvinyl alcohols, agar, sodium alginate, hydrolyzed cellulose esters, hydrophilic polyvinyl copolymers and the like.

The antistatic composition can be coated directly on the opposite side of the support from the emulsion layers or may be coated over any of a wide variety of subbing layers known in the art. Typical subbing layers include copoly (vinylidene chloride-acrylonitrile-acrylic acid), cellulose nitrate and other cellulose derivatives.

The radiation sensitive layers of the elements of the present invention can take a wide variety of forms. The layers can comprise photographic silver salt emulsions, such as silver halide emulsions; diazo type compositions; vesicular image forming compositions; photopolymerizable compositions; and the like.

Murry U.S. Pat. No. 2,728,664; and Leubner and Murray U.S. Pat. No. 2,728,665

The invention is illustrated by the following examples:

EXAMPLES 1, A-H

General Procedure

A coating composition is prepared by mixing cellulose acetate having an acetyl content of 39.8 weight percent, a three-part solvent mixture in accordance with this invention and an antistatic copolymer of N-vinylbenzyl-N,N,N-trimethyl ammonium chloride-coethylene glycol dimethacrylate (93:7 mol ratio), the quantities of each, expressed in Table II as percent by weight. Each coating was applied to a cellulose triacetate film base in a dry coverage of 0.35 gms./M².

TABLE II

|  | A | B | C | D | E | F | G | H (control) |
|---|---|---|---|---|---|---|---|---|
| Cellulose Acetate (Type 398-3) | 1.0 | 1.0 | 1.0 | 1.0 | 0.94 | 0.94 | 0.94 | 1.00 |
| Acetone | 55.00 | 55.00 | 50.00 | 50.00 | 55.00 | 55.00 | 55.00 | 50.00 |
| Methanol | 29.77 | 19.77 | 35.77 | 31.77 | 20.83 | 29.83 | 20.83 | 24.77 |
| Quaternary Ammonium Salt | 4.23 | 4.23 | 4.23 | 4.23 | 4.23 | 4.23 | 4.23 | 4.23 |
| n-Propyl Acetate | — | — | 9.00 | 13.00 | 19.00 | — | — | — |
| Methyl Chloroform | — | — | — | — | — | — | — | 20 |
| 1-Methoxy-2-Propanol | 10.00 | 20.00 | — | — | — | — | — | — |
| Cyclohexane | — | — | — | — | — | 10.00 | 19.00 | — |
|  | 100.00 | 100.00 | 100.00 | 100.00 | 100.00 | 100.00 | 100.00 | 100.00 |

Photographic silver halide emulsions useful in our invention comprise any of the ordinarily employed silver halide developing-out emulsions, such as silverchloride, -chlorobromide, -chloroiodide, -chlorobromoiodide, -bromide and -bromoiodide emulsions.

Photographic silver halide emulsions useful in our invention can also contain such addenda as chemical sensitizers, development modifiers, antifoggants, and the like. Examples of these can be found in *Product Licensing Index*, Publication 9232, Vol. 92Dec. 1971, pp. 107-110.

The emulsions may also be chemically sensitized with reducing agents such as standout salts (Carrol U.S. Pat. No. 1,487,850), polyamines such as diethylene triamine (Lower and Jones, U.S. Pat. No. 2,518,698), polyamines such as spermine, (Lowe and Allen U.S. Pat. No. 2,521,925), or bis-(β-aminoethyl) sulfide and its watersoluable salts (Lowe and Jones U.S. Pat. No. 2,521,926), sulfur sensitizers (e.g., allyl thiocarbamate, thiourea, allyl isothiocyanate, cystine, etc.), various gold compounds (elgl, pottassium chloroaurate, auric tricholoride, etc. See U.S. Pat. Nos. 2,540,085; 2,597,856; and 2,597,915, etc.).

The emulsions according to the invention can also contain speed-increasing compounds of the quaternary ammonium type as described in U.S. Pat. Nos. 2,271,623; issued Feb. 3, 1942; 2,288,226, issued Jun. 30, 1942; 2,334,864, issued Nov. 23, 1943; or the thiopolymers as described in Graham et. al., U.S. Pat. No. 3,046,129; and Dann et. al. , U.S. Pat. No. 3,046,134.

The emulsions may also be stabilized with mercury compounds and the like such as described in Allen, Byers and Murray U.S. Pat. No. 2,728,663; Carroll and Each sample was visually inspected for bloom which is evidenced by haze when viewed under specular light. The control H using an environmental disadvantaged solvent and all the example in accordance with the invention were free of haze.

We claim:

1. A coating composition for applying an antistatic layer to a surface comprising a hydrophobic binder and an antistatic polymer having the formula:

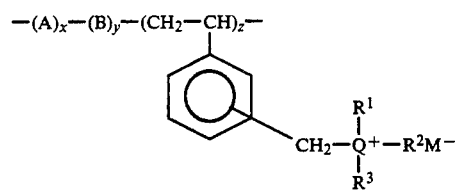

wherein:
A represents units of an addition polymerizable monomer containing at least two ethylenically unsaturated groups;
B represents units of a copolymerizable α, β-ethylenically unsaturated monomer;
Q is N or P;
$R^1$, $R^2$ and $R^3$ are independently selected from the group consisting of carbocyclic and alkyl groups;
$M^-$ is an anion;
x is from about 0.1 to about 20 mole percent;
y is from about 0 to about 90 mole percent; and
z is from about 10 to about 99 mole percent;
in a solvent mixture comprising from 8 to 30 percent by weight of n-propyl acetate, 1-methoxy-2- propanol or cyclohexane; from 50 to 55 weight percent of acetone and the balance methanol.

2. The composition of claim 1 wherein the n-propyl acetate, 1-methoxy-2-propanol or cyclohexane is present in the amount of 10 to 25 percent by weight based on the total weight of the solvent mixture.

3. The composition of claim 1 wherein the n-propyl acetate, 1-methoxy-2-propanol or cyclohexane is present in the amount of 12 to 20 percent by weight based on the total weight of the solvent mixture.

4. The composition of claim 1 wherein the solvent mixture contains n-propyl acetate.

5. The composition of claim 1 wherein the solvent mixture contains 1-methoxy-2-propanol.

6. The composition of claim 1 wherein the solvent mixture contains cyclohexane.

7. The composition of claim 1 wherein the weight ratio of hydrophobic binder is antistatic polymer is about 10:1 to 1:1.

8. The composition of claim 1 wherein the weight ratio of hydrophobic binder to antistatic polymer is about 6:1 to 1:1.

9. The composition of claim 1 wherein the weight ratio of hydrophobic binder to antistatic polymer is bout 3:1 to 1.5:1.

10. The composition of claim 1 wherein x is from about 5 to 10 mole percent.

11. The composition of claim 1 wherein A is a unit of ethylene glycol dimethacrylate.

12. The composition of claim 1 wherein $R^1$, $R^2$ and $R^3$ are methyl.

13. The composition of claim 1 wherein said antistatic polymer is copoly [Nvinylbenzyl-N,N,N-trimethylammonium chloride-co-ethylene glycol di-methacrylate] (93:7).

14. The composition of claim 1 wherein said hydrophobic binder is selected form the group consisting of acetylated cellulose, poly(methylmethacrylate) and poly (vinyl acetal).

15. The composition of claim 1 wherein said support is a cellulose acetate and wherein said hydrophobic binder is an acetylated cellulose.

16. The composition of claim 1 wherein said antistatic polymer is copoly[N-vinylbenzyl-N,N.N-trimethylammonium chloride-co-ethylene glycol dimethacrylate] (93:7) and said hydrophobic binder is 39% acetylated cellulose.

* * * * *